United States Patent Office 3,147,292
Patented Sept. 1, 1964

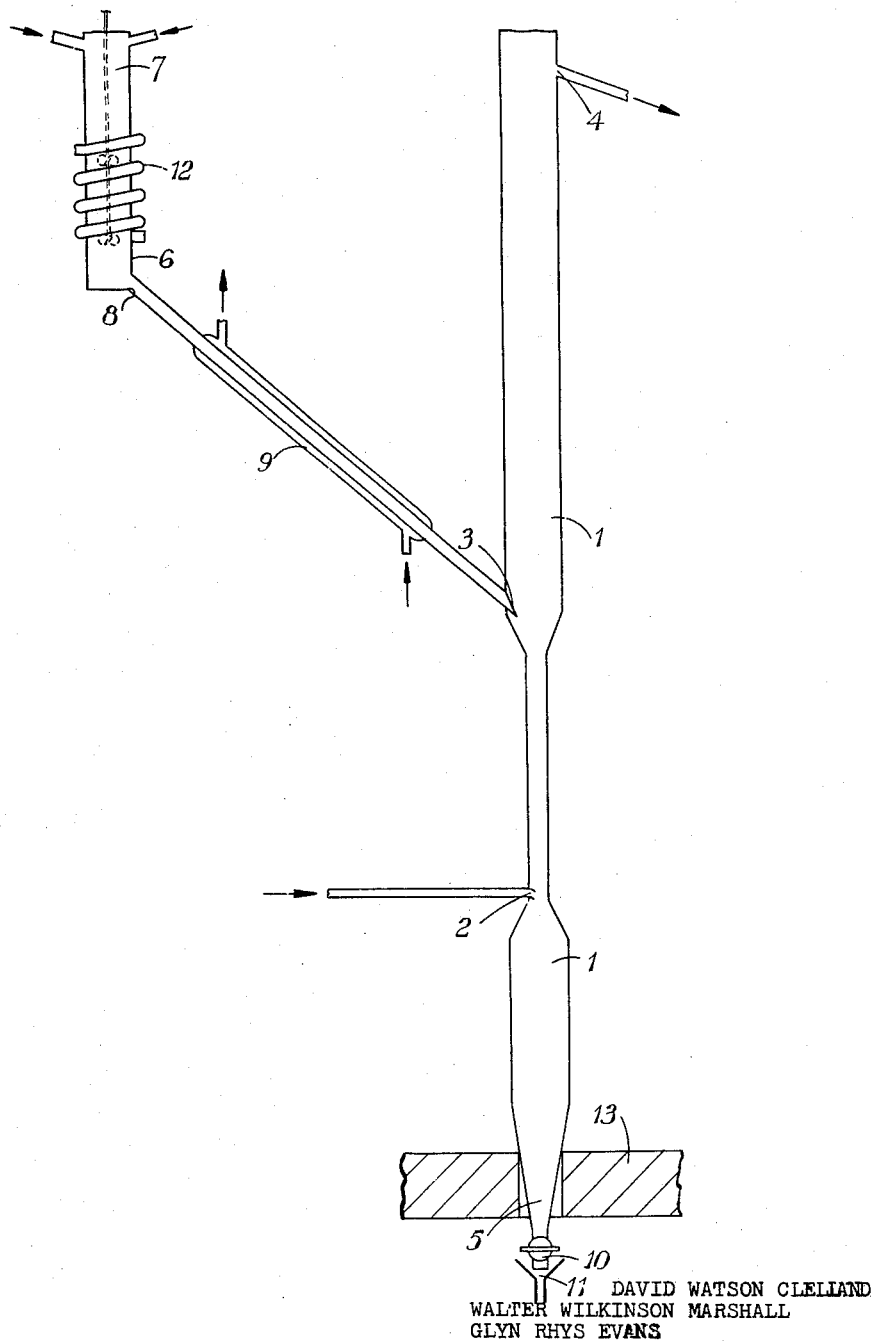

3,147,292
PRODUCTION OF PLUTONIUM
David Watson Clelland, Appleton, and Walter Wilkinson Marshall and Glyn Rhys Evans, Seascale, Cumberland, England, assignors to United Kingdom Atomic Energy Authority, London, England
Filed Jan 21, 1960, Ser. No. 3,932
1 Claim. (Cl. 260—429.1)

This invention relates to the production of plutonium and its compounds.

In the production of plutonium and its compound by chemical processes there is a limit of mass, volume, geometry or concentration because of the possibility of critical conditions arising if that limit is exceeded. One process which has been proposed for the production of plutonium involves the intermediate step of precipitating plutonium oxalate from plutonium nitrate solution by the addition of oxalic acid and it is an object of the present invention to provide a process in which this intermediate step may be carried out continuously in equipment having a geometry which avoids criticality hazards.

According to the present invention a process for producing plutonium oxalate from plutonium nitrate comprises the steps of feeding plutonium nitrate solution and oxalic acid solution to a stirred vessel maintained at about 80° C. to mix the solutions and effect precipitation of plutonium oxalate, allowing gravity flow of the stirred mixture through a cooler to an intermediate point in a column having an upward flowing feed from near its base of an aqueous mixture of oxalic acid and nitric acid, and collecting plutonium oxalate from the base of the column.

One way of carrying the invention into effect will now be described by way of example with reference to the accompanying drawing which is a diagrammatic elevation.

In the drawing is shown a washing column 1 having inlets 2, 3 and outlets 4, 5. A precipitating vessel 6 fitted with a stirrer 7 and a heater coil 12 has an outlet 8 which is connected to the head of a conventional water cooled Liebig condenser 9. The lower end of the condenser 9 is connected to the inlet 3 of the column 1. The outlet 5 of the column 1 passes through shielding 13 and is provided with a motorised outlet valve 10 and a receiver 11.

To operate the apparatus plutonium nitrate solution and oxalic acid solution are fed separately to the vessel 6 which is maintained at approximately 80° C. by means of the heater coil 12. The solutions are mixed by the stirrer 7 and plutonium oxalate is precipitated. The resultant slurry flows under gravity through the outlet 8 into the condenser 9 where it is cooled to about 25° C. so as to avoid convection currents which would hinder sedimentation in the column 1. The slurry then enters the column 1 in which a washing mixture of oxallic acid and nitric acid in aqueous solution is flowing upwards. The plutonium oxalate precipitate settles to the bottom of the column 1 through the upward flowing solution and may be continuously withdrawn into the receiver 11 through the valve 10. The mother liquor, which comprises principally an aqueous solution of oxalic acid and nitric acid, overflows at the outlet 4.

The system gives a high throughput with equipment which is of "eversafe" geometry for criticality reasons.

We claim:
A process for continuously producing plutonium oxalate from plutonium nitrate comprising continuously feeding a plutonium nitrate solution and oxalic acid solution to a reaction zone maintained at a temperature of about 80° C., stirring said solution to mix same and form a slurry of plutonium oxalate, continuously passing the formed plutonium oxalate slurry by gravity from said reaction zone through a cooling zone to reduce the temperature thereof, passing the cooled slurry downwardly through a washing zone in countercurrent flow with an upwardly moving aqueous wash solution of oxalic acid and nitric acid, and withdrawing precipitated plutonium oxalate from the base of said washing zone.

References Cited in the file of this patent
UNITED STATES PATENTS

| | | |
|---|---|---|
| 1,231,410 | Moore | June 26, 1917 |
| 2,813,781 | Mertes | Nov. 19, 1957 |

OTHER REFERENCES

HW—49597A, Conversion Chemistry of Plutonium Nitrate, by K. M. Harmon and W. H. Reas, April 11, 1957, pp. 13, 14, 15 and 16.